United States Patent [19]

Swartz et al.

[11] Patent Number: 5,637,851

[45] Date of Patent: *Jun. 10, 1997

[54] LASER SCANNER FOR READING TWO DIMENSIONAL BAR CODES

[75] Inventors: Jerome Swartz, Old Field; Boris Metlitsky, Stony Brook, both of N.Y.

[73] Assignee: Symbol Technologies, Inc., Holtsville, N.Y.

[*] Notice: The term of this patent shall not extend beyond the expiration date of Pat. No. 5,414,250.

[21] Appl. No.: 388,480

[22] Filed: Feb. 14, 1995

Related U.S. Application Data

[63] Continuation of Ser. No. 794, Jan. 4, 1993, Pat. No. 5,414,250, which is a continuation of Ser. No. 317,433, Mar. 1, 1989, abandoned.

[51] Int. Cl.[6] .............................................. G06K 7/10
[52] U.S. Cl. ................................... 235/462; 235/470
[58] Field of Search .................................. 235/462, 470

[56] References Cited

U.S. PATENT DOCUMENTS

| | | | |
|---|---|---|---|
| 3,774,014 | 11/1973 | Berler | 235/471 |
| 3,801,775 | 4/1974 | Acker | 235/476 |
| 4,124,797 | 11/1978 | Himmel | 235/467 |
| 4,152,583 | 5/1979 | Makamura | 235/462 |
| 4,387,297 | 6/1983 | Swartz et al. | 235/462 |
| 4,588,882 | 5/1986 | Buxton | 235/487 |
| 4,652,730 | 3/1987 | Marshall | 235/436 |
| 4,776,464 | 10/1988 | Miller et al. | 209/3.3 |
| 4,777,356 | 10/1988 | Toyota et al. | 235/454 |
| 4,794,239 | 12/1988 | Allais | 235/462 |
| 4,871,904 | 10/1989 | Metlitsky et al. | 235/467 |
| 4,873,426 | 10/1989 | Sarna et al. | 235/462 |
| 4,879,456 | 11/1989 | Cherry et al. | 235/462 |
| 4,916,297 | 4/1990 | Tukada et al. | 235/462 |
| 4,931,628 | 6/1990 | Wada | 235/454 |
| 4,933,538 | 6/1990 | Heiman et al. | 235/462 |
| 4,967,074 | 10/1990 | von Stein | 250/236 |
| 4,988,852 | 1/1991 | Krishnan | 235/462 |

FOREIGN PATENT DOCUMENTS

| | | | |
|---|---|---|---|
| 115166 | 9/1980 | Japan | 235/462 |

*Primary Examiner*—Donald T. Hajec
*Assistant Examiner*—Michael G. Lee
*Attorney, Agent, or Firm*—Finnegan, Henderson, Farabow, Garrett & Dunner

[57] ABSTRACT

An apparatus and method for reading data in the form of indicia on a surface of a target, the indicia having a preferred reading direction, including a light source for illuminating a portion of the surface to be read with a laser beam in a scanning pattern at a predetermined scanning angle so as to scan spatially adjacent portions of the surface. A detector and a processor is provided that is operative for detecting at least a portion of the light reflected from the indicia and storing representations thereof, and further determining the angular difference between the preferred reading direction and the scanning angle. An optical component disposed adjacent the light source is provided for optically directing the laser beam along a path toward the surface and is capable of controlling and setting the predetermined scanning angle. Furthermore, the optical component may be automatically rotated so as to align the direction of scan with the preferred reading direction of the indicia.

25 Claims, 4 Drawing Sheets

LASER SCANNER FOR READING TWO DIMENSIONAL BAR CODES

This application is a continuation under 37 C.F.R. §1.60 of application Ser. No. 08/000,794 filed Jan. 4, 1993, now U.S. Pat. No. 5,414,250 which is a file wrapper continuation of Ser. No. 07/317,433, filed Mar. 1, 1989 now abandoned.

REFERENCE TO RELATED APPLICATIONS

This application is related to U.S. patent application Ser. No. 944,848, filed Dec. 22, 1986, now U.S. Pat. No. 4,516,661 and to U.S. patent application Ser. No. 07/317,533, filed simultaneously herewith.

BACKGROUND OF THE INVENTION

1. Field of the Invention

This invention generally relates to laser scanning systems for reading bar code symbols or similar indicia and, more particularly, to a laser imaging system for generating a laser beam scan pattern which extends in a two dimensional pattern over the symbols to be read, and a digital processing system for storing, manipulating, and analyzing the scanned image.

2. Description of the Related Art

Various optical readers and optical scanning systems have been developed heretofore for reading bar code symbol appearing on a label or on the surface of an article. The bar code symbol itself is a coded pattern of indicia comprised of a series of bars of various widths spaced apart from one another to bound spaces of various widths, the bars and spaces having different light-reflecting characteristics. A number of different bar code standards or symbologies exist. These symbologies include UPC/EAN, Code 128, Codabar, and interleaved 2 of 5. The readers and scanning systems electro-optically decode the symbol to multiple alphanumerical characters that are intended to be descriptive of the article or some characteristic thereof. Such characters are typically represented in digital form as an input to a data processing system for applications in point-of-sale processing, inventory control, and the like Scanning systems of this general type have been disclosed, for example, in U.S. Pat. Nos. 4,251,798; 4,360,798; 4,369,361; 4,387,297; 4,409,470 and 4,460,120, all of which have been assigned to the same assignee as the instant application As disclosed in some of the above patents, one embodiment of such a scanning system resides, inter alia, in emitting a laser light beam from a hand-held, portable laser scanning head supported by a user, and aiming the head, and more particularly, the laser light beam, at a symbol to be read. The scanner functions by repetitively scanning the laser beam in a line across the symbol. A portion of the reflected laser light which is reflected off the symbol is detected, and electronic circuitry or software decodes the electrical signal into a digital representation of the data represented by the symbol scanned.

More specifically, a scanner includes a light source such as a gas laser or semiconductor laser that generates a light beam. The use of semiconductor devices as the light source in scanner systems is especially desirable because of their small size, low cost and low power requirements. The light beam is optically modified, typically by a lens, to form a beam spot of a certain size. It is preferred that the beam spot size be approximately the same as the minimum width between regions of different light reflectivity, i.e., the bars and spaces of the symbol. The relative size of the bars and spaces is determined by the type of coding used, as is the actual size of the bars and spaces. The number of characters per inch represented by the bar code symbol is referred to as the density of the symbol.

The light beam is directed by the lens or similar optical components along a light path toward a target that includes a bar code symbol on the surface. A scanning component is also disposed in the light path. The scanning component may either sweep the beam spot across the symbol and trace a scan line across and past the symbol, or scan the field of view of the scanner or do both. A scanner also includes a sensor or photodetector. The photodetector has a field of view which extends across and slightly past the symbol and functions to detect light reflected from the symbol. The analog electrical signal from the photodetector is first typically converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

Laser scanners are not the only type of optical instrument capable of reading bar code symbols. Another type of optical reader is one which is operative being placed by the user in direct contact with the symbol to be read. Such readers typically incorporate detectors based upon charge coupled device (CCD) technology in which the size of the detector is larger than or substantially the same as the symbol to be read. Such scanners are lightweight and easy to use, but require substantially direct contact or placement of the reader on the symbol to enable the symbol be read. Such contact reading is a preferred mode of operation for some applications or as a matter of personal preference by the user. Contact or near contact reading may also be implemented in an appropriately designed laser scanner.

With respect to the scanning pattern generated by laser scanners, it has previously been known to generate scan patterns of mutually parallel scan lines extending along one or two directions, especially for fixed, stationary, or tabletop type scanners. Omni-directional scan patterns of intersecting scan lines, and even curvilinear scan patterns, for superposition over the symbol to be read, are known in the prior art. The purpose of such scanning patterns is to insure that, no matter what the angular orientation of a symbol might be, within predetermined limits, at least one of the scan lines or part of the pattern will be scanned over the entire length of the respective symbol. A drawback of such an approach is that such patterns are typically generated by highly complex and expensive optical and mechanical systems.

U.S. patent application Ser. No. 944,848 now U.S. Pat. No. 4,816,661 describes a hand-held laser scanner that generates a scan pattern of mutually parallel scan lines extending linearly across each symbol. The scan lines are arranged over the height of the symbol. At least one of the scan lines sweeps across each symbol along one sweep direction, whereas, at least another of the scan lines sweeps across each symbol along an opposite sweep direction countercurrent to said one sweep direction, thereby forming a bidirectional scan in which a respective symbol can be read by the a scan line no matter whether the symbol is oriented in the correct left-right direction, or is upside down.

In either hand-held or stationary scanners, with the scan being generated by mechanically oscillating or moving a light source or a mirror, the direction of each scan is fixed relative to the reader housing. If there is only one scan line, and the bar code symbol is located at an angle to this linear scan of the laser beam, then the user of a hand-held unit must twist the unit to align it with the angle of the bar code. Or, the operator of a stationary unit must twist the product to retry, hoping to align the symbol with one of the several scan lines. When a hand-held reader unit is being used at a retail check-out counter, the objects having bar codes to be read will be randomly oriented, and the items will be of many different sizes and shapes. Properly positioning the hand-held reader unit for reading bar codes thus becomes an awkward task. On the other hand, scanners generating several scan paths at angles to one another still often require the operator to try several passes of the product until a valid read is obtained. Multiple-scan readers produce only a few fixed paths for scan lines, and if none of the paths are correct the operator must make additional passes until a code-recognition signal is produced.

In order to provide more information in the bar code symbols, and to allow the symbols to be smaller or more compactly shaped, new bar code standards have been adopted. One of these new code standards, Code-49, uses a more complex but efficient character set, and also introduces a "two-dimensional" feature so more data is contained in the symbol; this is accomplished by stacking rows of characters vertically instead of extending the bars horizontally. That is, there may be two or more rows of bar and space patterns up to eight, instead of only one row.

U.S. Pat. No. 4,794,239 is hereby incorporated by reference as describing such a bar code structure. A one-dimensional single-line scan, as ordinarily the case for hand-held readers, where the laser beam is swept back and forth across a narrow arc, has disadvantages in reading these two dimensional bar codes; that is, the reader must be aimed at each row, individually. Likewise, the multiple-scan-line readers produce a number of scan lines at an angle to one another so these are not suitable for recognizing Code-49 type of two-dimensional symbols. Prior to the present invention, there has not been a laser scanner that is particularly suitable for reading two dimensional bar code symbols or other indicia.

SUMMARY OF THE INVENTION

1. Objects of the Invention

It is a general object of this invention to advance the state of the art of laser scanning systems for reading bar code symbols.

It is another object of this invention to generate scan patterns of mutually parallel lines over the symbol with a relatively simple pattern generator system, with the option of changing the angular orientation of the mutually parallel lines to align with the horizontal direction of the bar code.

It is a further object of this invention to generate a scan pattern of mutually parallel scan lines, detecting the reflected light and producing and storing a digital representation thereof.

It is another to provide a laser scanning based computer imaging and analysis system for storing and analyzing coded indicia or other surface characteristics of an article.

Another is to provide a system for converting a laser scanned image of an article into a digital representation, storing the digital representation, and analyzing the digital representations to derive characteristics such as spatial orientation therefrom.

2. Features of the Invention

In keeping with these objects, and others which will become apparent hereinafter, one feature of this invention resides, briefly stated, in an optical arrangement for use in a laser scanning system for reading symbols, particularly bar code symbols having alternate bars and spaces arranged in a pattern which the symbol is affixed. The scanning system comprises a housing having an exit port, a laser source, e.g. a gas laser tube or a semiconductor laser diode, for generating laser beam, and scanning means in the housing for scanning the laser beam in scans across successive symbols located exteriorly of the housing. The optical arrangement comprises optical means in the housing for directing the scanning beam along an optical path through the exit port at a controllable angular orientation. The optical arrangement also forms the scanning beam with a cross-sectional beam spot of a predetermined waist size at a predetermined distance from the exit port of the housing.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
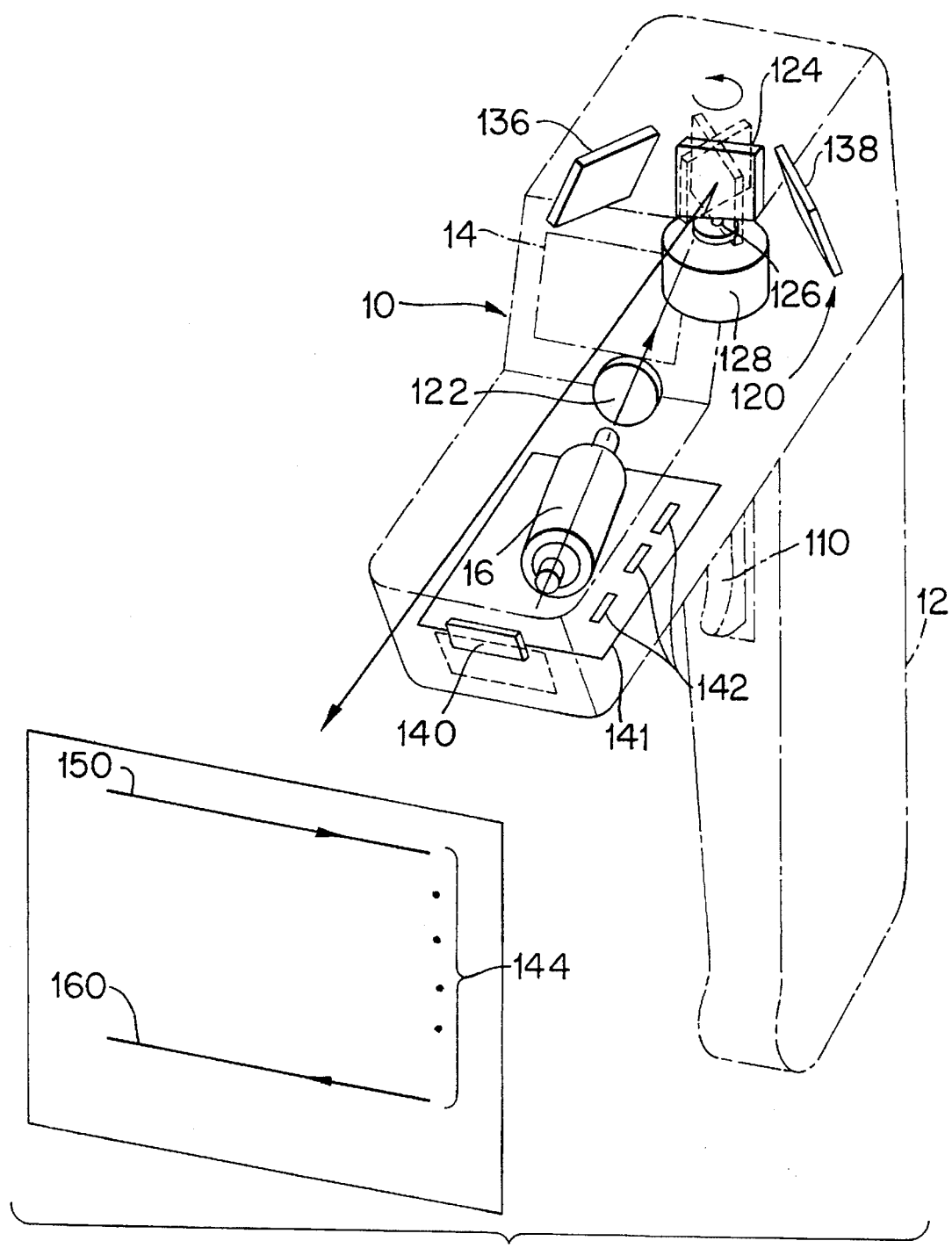
FIG. 1 is a perspective view of a hand-held laser scanner including a scan pattern generator in accordance with this invention, and diagrammatically illustrating a multiple scan pattern.

Referring now to the drawings, reference numeral 10 in FIG. 1 generally identifies an optical arrangement in a laser scanning system of the type generally described in the above-identified patents and patent applications, the entire contents of all of which are hereby incorporated by reference herein, for reading symbols, particularly bar code symbols. As used in this specification and the following claims, the term "symbol" is intended to be broadly construed and to cover not only symbol patterns composed of alternating bars and spaces of various widths, but also other one or two dimensional graphic patterns, as well as alphanumeric characters.

The arrangement 10 includes a housing 12, shown in dashed lines, and intended to represent a hand-held scanner. The arrangement 10 may also be implemented in a desk-top workstation or stationary scanner. In the preferred embodiment, the housing includes an exit port 14 through which an outgoing laser light beam is directed to impinge on, and to be scanned across, symbols located exteriorly of the housing. A manually actuated trigger 110 or similar means are provided to initiate scanning so that each symbol may be scanned and read in its respective turn. A laser source, e.g. a gas laser tube 16 or a semiconductor laser diode, is mounted in the housing and, when energized, the source 16 generates a laser beam.

A multiple line scan pattern generator 120 is illustrated in FIG. 1 and is operative for generating multiple scan lines or traces shown as 150, 152, etc. across a symbol to be read in a scan line pattern 144. The scan pattern generator 120 also functions for positioning at least some of the scan lines at different working distances from the housing 12 in which the generator 120 is housed.

Laser source 16 directs a laser beam through optical lens 122 for directing the beam onto rotary main mirror 124 which is mounted on a vertical shaft 126 which is rotated by a motor drive 128 about a vertical axis. Mirror 124 has opposite major planar surfaces which are separated by a mirror thickness having dimension $T_3$. A light-reflecting coating is applied over one of the surfaces.

The generator 120 also includes a pair of stationary first surface side mirrors 136, 138 inclined at angles relative to the vertical axis of the shaft 126, and also including an angle with each other. Side mirrors 136, 138 have front surfaces on which light-reflecting coatings are respectively applied. Inclined side mirrors 136, 138 are so positioned relative to main mirror 124 that, during rotation of mirror 124, laser light impinging on mirror 124 will, at certain times, during each revolution of mirror 124, be directed toward one of the side mirrors for reflection therefrom forwardly to the exterior target.

To produce scan lines vertically spaced from one another, the motor 128 and mirror 124 are rotated about a horizontal axis parallel to the scan line 150, using a stepper motor, as disclosed in said copending application. After each horizontal scan, a step is introduced to change the angle slightly so that the next scan is vertically displaced. In this manner, a "raster" scan of the field of view is produced.

The multiple scan line pattern 144 depicted in FIG. 1 is generated as follows: Assume that mirror 124 is initially positioned with its coated surface directly facing laser source 16. The laser beam emitted by source 16 is returned along the same optical path for impingement on a symbol located at distance $D_1$ from the housing 12. During rotation of mirror 124, scan line 150 is generated. Eventually, the mirror 124 will direct the laser beam incident thereon to side mirror 136 for reflection by coated surface 140 forwardly for impingement on a symbol located at distance $D_2$. $D_2$ is shorter that $D_1$ due to the diversion of the beam to side mirror 136. During rotation of mirror 124 scan line 152 is generated. Scan line 152 is swept in the opposite direction to that of scan line 150. A more detailed description of the operation of the optical arrangement 10 is set forth in U.S. patent application Ser. No. 944,848, now U.S. Pat. No. 4,816,661 incorporated herein by reference.

As best shown in FIG. 1, it will be noted that the scan pattern 144 comprises a plurality of scan lines in mutual parallelism, with scan lines 150 being a first scan line through 160 being an nth scan line All the scan lines are spread apart over the height of the symbol. This spread can be controlled by, and is a function of, the thickness of mirror 124, the angle 0 of incidence of the laser beam on mirror 124, and the index of refraction n' of mirror 124, the latter being preferably constituted of glass. Also, the beam spot is focused and alternately located at either working distance $D_1$ or $D_2$, thereby obtaining a zooming function.

Also, quite apart from the angular orientation of the symbols to be read, one symbol might be located close-in to the scanner, whereas another symbol might be located far-out from the scanner and, in short, successive symbols may be located at different working distances from the scanner. In the case of a scanner which has been designed to read symbols within a certain range of working distances, should it occur that a particular symbol falls outside this range, then the distance between the scanner and the symbol must be adjusted, and usually within a short time interval, for, otherwise, the symbol will not be read. In the case of a hand-held scanner, the scanner is usually manually moved toward or away from the symbol to adjust the distance between the scanner and the symbol.

Figure 2:
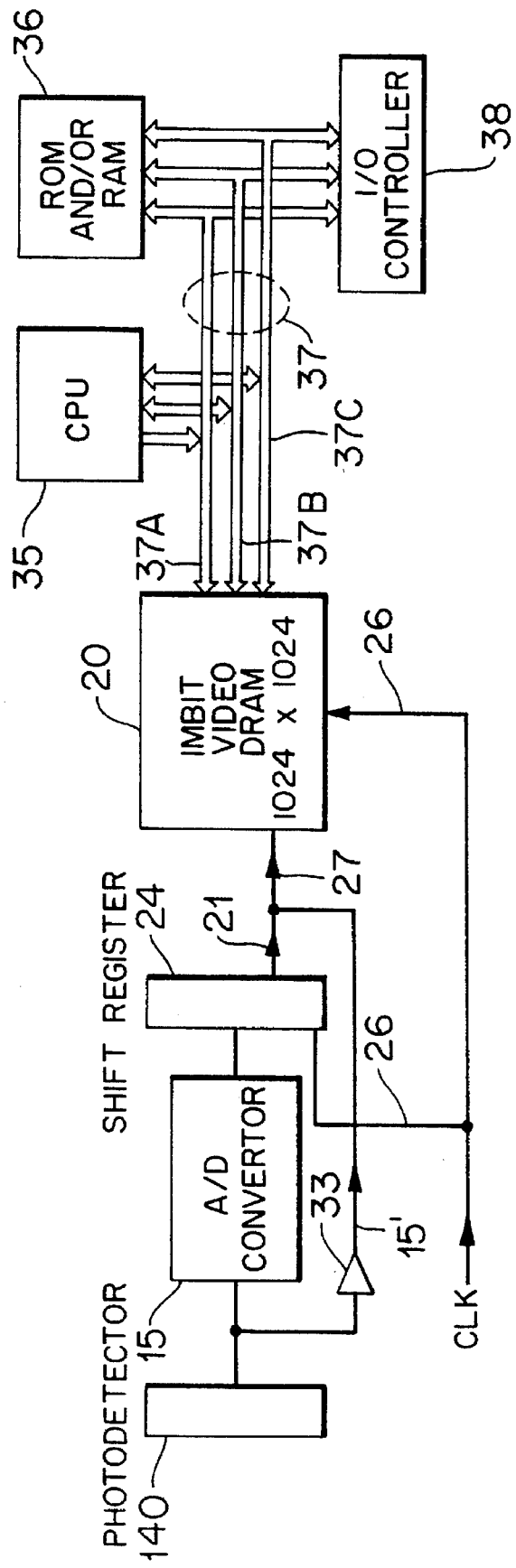
FIG. 2 is a highly simplified block diagram of the image storage and processing circuitry used in the laser scanner according to the present invention.

Turning next to FIG. 2, there is shown a highly simplified block diagram of the electronic subsystems of the bar code reader according to one embodiment of the present invention.

In FIG. 2 an image is captured by photodetector 140 which is rotated electronically, or analyzed electronically, in the DRAM 20.

As illustrated in FIG. 2, the photodetector 140 receives the reflected light and is used to generate an electrical image of the field of view of the photodetector. The output of the photodetector 140 is preferably a serial binary signal. However, if a gray-scale type of resolution is needed, then an analog signal output from the photodetector 140 may be used, which is passed through line 15' and digitized by digitizer 33 or applied to an analog to digital converter 15 to produce a multi-bit binary representation of the light reaching the photodetector 140 as the laser beam is scanned throughout the scan pattern 144. A serial single-bit, or multi-bit parallel binary output of the A/D converter, represents the light impinging upon the photodetector.

The field of view of the photodetector 140 over an entire scan pattern may be represented as a large predetermined number of elements or pixels arranged in rows and columns. As each line is scanned, the photodetector 140 produces a single-bit serial binary output, or the A/D converter 15 converts the analog signal into a multi-bit digital representation, one pixel at a time. Assuming single-bit serial binary, the digital representation from the photodetector 140 is shifted into a serial input 27 of the DRAM 20; however, if a multi-bit representation is used, it is loaded into a shift register 24, one group of elements at a time, by clock voltages applied to the register elements by clock lines 26. The shift register 24 is clocked onto the line 21 by clock line 26.

As an example of the type of scanning that may be performed with the laser scanner according to the present invention, the following parameters may be presented as typical. A total of 50 to 100 lines or more, such as the lines 150 . . . 160, may be generated to form the scan pattern 144 with 2" scan lines over a target area of ½" or 1". Each horizontal line 150, 152, etc. corresponds to one row in the array of the memory 20, so the size of the memory is correlated with the drive mechanism for the mirror 124 producing the raster scan of the field of view. The laser beam will operate at a 10 to 20 fps sweep speed, with the laser spot moving at about 2500 ips. The bar code density may be 7.5 to 10 mil square for reasonable resolution characteristics. The bandwidth represented by such scanning is well within the capability of various commercially available signal processors and decoders.

The field of view scanned by the laser scanner may be divided into an array of for example, 256×256, 512×512, or 1024×1024, depending upon the scan generating mechanism. Using 1024×1024, there would be 1024 rows of "pixels" and 1024 "pixels" in each row (1024 columns). The density of the raster scan of the field of view by the laser beam, and thus of the memory 20, is selected according to the resolution required for the system, and may be more or less than these examples. However, continuing with the example of 1024×1024, note that the memory 20 is also a 1024×1024 array. For example, a 1-M bit DRAM of the type commercially available may be provided having both serial and random-access I/O ports.

The clocks used to load the DRAM 20 via serial input 27, and the addressing of the DRAM 20 to load data from its serial input register to its cell array, must both be correlated with the mechanical scan generator; every time a horizontal line such as 150 or 152 is finished, the data for this line should have filled the internal register and be shifted to the cell array.

The DRAM 20 has an array of dynamic memory cells in rows and columns having a one-for-one correspondence to the pixel array to be imaged, so there are 1024 rows and 1024 columns of cells. So, after 1024 clock pulses on the input 26, the internal shift register at its serial input is full, and one clock on its "transfer" input loads this 1024 bits of data onto the 1024 column lines of the DRAM array; then, one of the 1024 row lines of the array is activated by a row decoder to load this 1024 bits of data to one of the rows of memory cells of the array, where they will remain stored until written over. The sequence then repeats for the next subsequent scan of the reference plane by the laser scanner; another 1024 bits are shifted into the internal shift register of the DRAM, so, after 1024×1024 clocks on line 26, all 1M-bit of data from the photodetector 140 will have been transferred to the DRAM 20. The detected light representing a sequence of picture elements derivated from a scan of the field of view by the photoresponsive device 140 are thus transformed into electrical charge packets which are transferred in a bit-mapped manner into the memory 20, one-for-one, in corresponding locations.

The bit-mapped image in the memory 20 is accessed by a CPU device 35 of FIG. 2. An external memory 36 may be employed for storing programs and data. A system bus 37 includes an address bus 37a, a data bus 37b and a control bus 37c: the bus is used for accessing the memory 36, and of course for accessing the DRAM 20, as well as for accessing an I/O controller (or controllers) 38 for communicating with a keyboard input, a display, or data output to a host computer, or the like, or to send a control signal to the optical component.

The DRAM 20 has a data I/O port connected to the data bus 37b for accessing the bit-mapped data by the CPU. The DRAM 20 can have a 4-bit wide data I/O port, so four bits are accessed in parallel at one time, instead of 1-bit. The DRAM 20 has a multiplexed address input connected to address bus 37a: a row address is applied first, along with a row address strobe on the control bus 37c, then a column address is applied along with a column address strobe.

These addresses are loaded into internal address buffers for the row and column decoders in the video DRAM 20.

Thus, an address is applied to the row decoder from the CPU to make a 1-of-1024 selection for loading the serial data input 27 to one of the 1024 rows of the DRAM cells. Or, an address is applied to the row decoder to select a row for input to the DRAM column decoder, then a 6-bit address applied to the column decoder from the CPU to select 4-or 256 columns for output on the data bus 37b to the CPU 35. In this manner, the CPU accesses the bit-mapped image data in the memory 20 to scan the image of the field of view, to find the symbol 10. A test is done to determine whether a portion of a bar code has been detected, based upon the symbology or definition of the bar code itself. If an entire bar code has been detected, it will then be decoded.

The CPU 35 can access the DRAM 20 via data bus 37b and address bus 37b at the same time that the serial data is being clocked into the serial port 27 by clock 26, so the CPU can begin evaluating the image to find and orient the symbol before the entire image has been loaded. The time needed to transfer the bit-mapped image is about (1M)×(50 ns) or 50-ms, assuming a 20 MHz clock 26, but during this time the CPU can make many thousands of accesses of the data in the DRAM for evaluation. If higher speeds are required, some video DRAMs support much higher serial clock rates, e.g., 40-MHZ. Also, a "by-4" serial input is available, which would allow four serial bit streams to be clocked in simultaneously. In addition, if a static RAM is used instead of a DRAM 20, clock speeds can be faster; a serial-to-parallel converter using a high-speed 8-bit shift register can be used to input the data from the CCD to a static RAM having an 8-bit parallel data I/O port.

FIG. 3a–4d shows an example of a bar code symbol of the type to be read by the system of FIGS. 1 and 2. Although the system is suitable for reading various types of bar codes, this symbol is a code-49 type, having (in this example) five rows 48 of characters represented by bar and space patterns. The physical size of this symbol is variable; the lower limit is specified to be 7.5 mil for the "X" dimension, i.e., the width of a minimum-width line in one of the bars in one of the rows 48; the upper limit depends upon the method used to reproduce the symbols, the focal length and field of view of the optical system to be used, and of course the size of the objects to which the coded symbols are to be applied. Using minimum sized symbols, a net data density of 93.3 alphanumeric characters per inch or 154.3 numeric digits per inch can be achieved with this standard code. The Code-49 specification allows up to eight rows 48 in one symbol. The view of FIG. 3c–3d is much larger than actual size for many Code-49 type symbols printed for use in typical applications. Each row will always begin with a start pattern 49 and end with a stop pattern 50. Between the start and stop patterns, a number of words 51 are defined by the width and spacings of black lines and gaps; each word encodes two characters from a defined character set. The image bit-mapped into the memory 20 of course corresponds to tie black and white pattern of FIG. 3a–3d and 4 translated to binary ones and zeros. The optics, size of field of view 11, number of bits (resolution) of the photo-responsive device 140, etc., are all chosen so that the minimum line width in the patterns of FIGS. 3a–3a and 4, when translated to a bit-mapped image in the memory 20, produces at least one bit or one cell of data in the DRAM 20. For the example of the use of a 256×256 (64K-bit) memory 20, the pattern of FIG. 4 must be occupy at least about 75-bits of the 256-bit width of a row of the memory array.

Figure 3A:
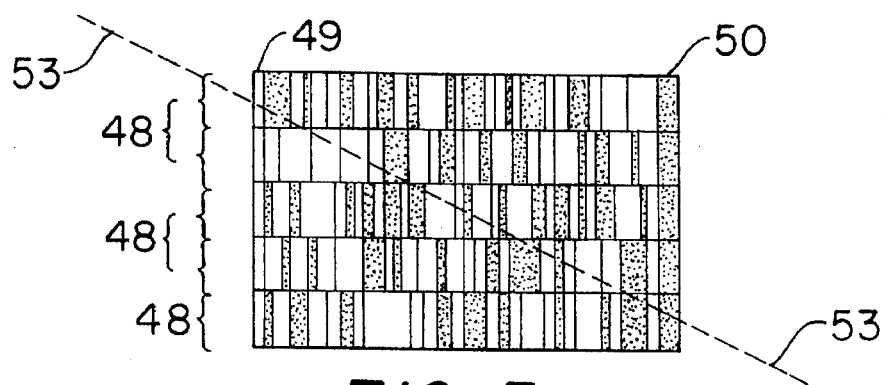
FIG. 3a is a simplified diagrammatic illustration of the operation of the present invention showing a single scan line passing through a two-dimensional bar code.
Figure 3B:
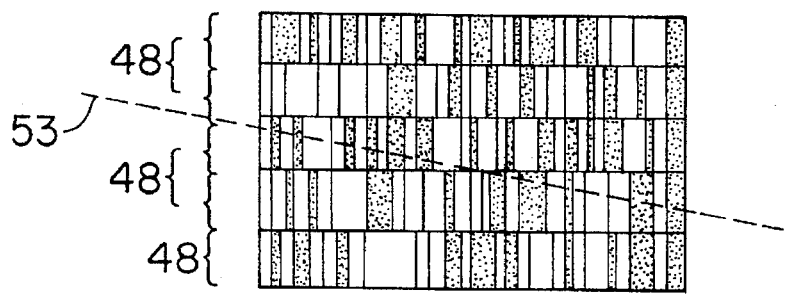
FIG. 3b is a simplified diagrammatic illustration of the single scan passing through the two dimensional bar code at a second stage of operation.
Figure 3C:
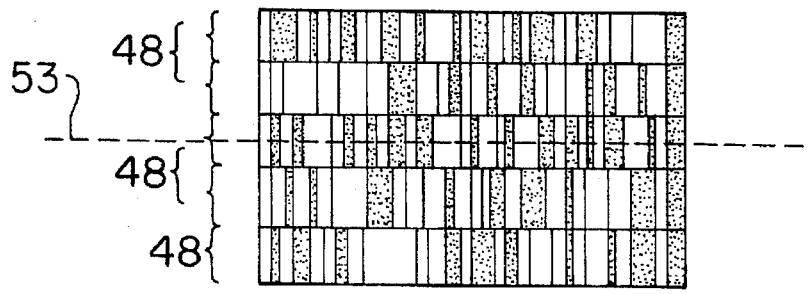
FIG. 3c is a simplified diagrammatic illustration of a single scan passing through a two-dimensional bar code at a third stage of operation.
Figure 3D:
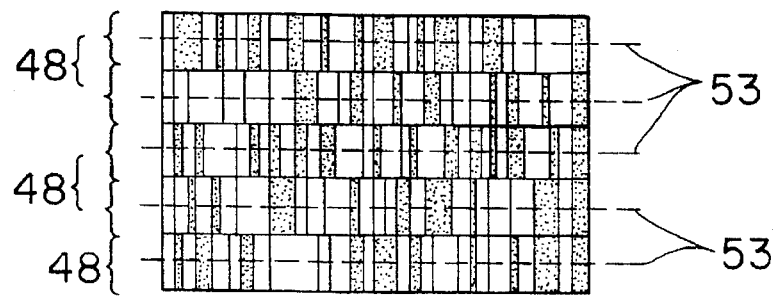
FIG. 3d is a diagrammatic illustration of the multiple scan pattern passing through a two-dimensional code at an angle which enables the bar code to be read.
Figure 4:
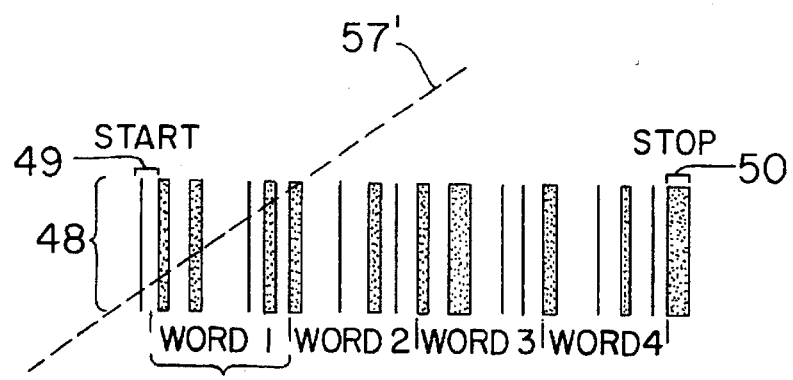
FIG. 4 is an enlarged view of one row of a truncated bar code symbol to illustrate its component parts.
Figure 5:
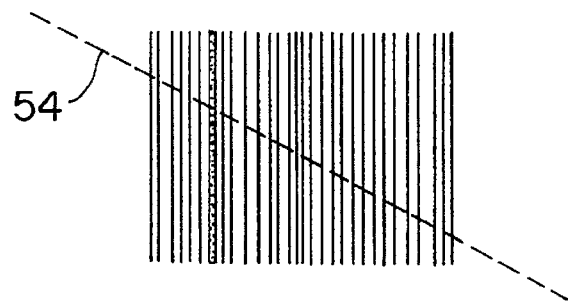
FIG. 5 is an enlarged view of a UPC bar code symbol with a scan line at an oblique angle passing through the entire symbol.

Referring to FIG. 3a, a scan along a line 53 would intercept parts of more than one row 48 and so would produce a reading which would indicate the presence of a bar code, but will not correctly decode. This is in contrast to a more-conventional UPC type of bar code symbol as seen in FIG. 5, where a scan line 54 at an angle to the central axis will still produce a valid reading since the UPC symbol illustrated is not truncated but extends in the Y-direction. Addition of the multiple rows 48 in the Code-49 type of symbol seen in FIG. 3a–3d thus makes the scanning task more difficult. Nevertheless, even though not giving a valid reading of an entire row 48, the scan line 53 would still result in a valid decode of a part of a row. For example, the line 53 as it appears in FIG. 3a or 3b makes a complete trace of some words in a horizontal row, but not of all words. This ability to intercept and interpret partial rows may be employed in the task of "finding" the symbol within the image in the memory 20 by the algorithm executed by the CPU 35.

Figure 6:
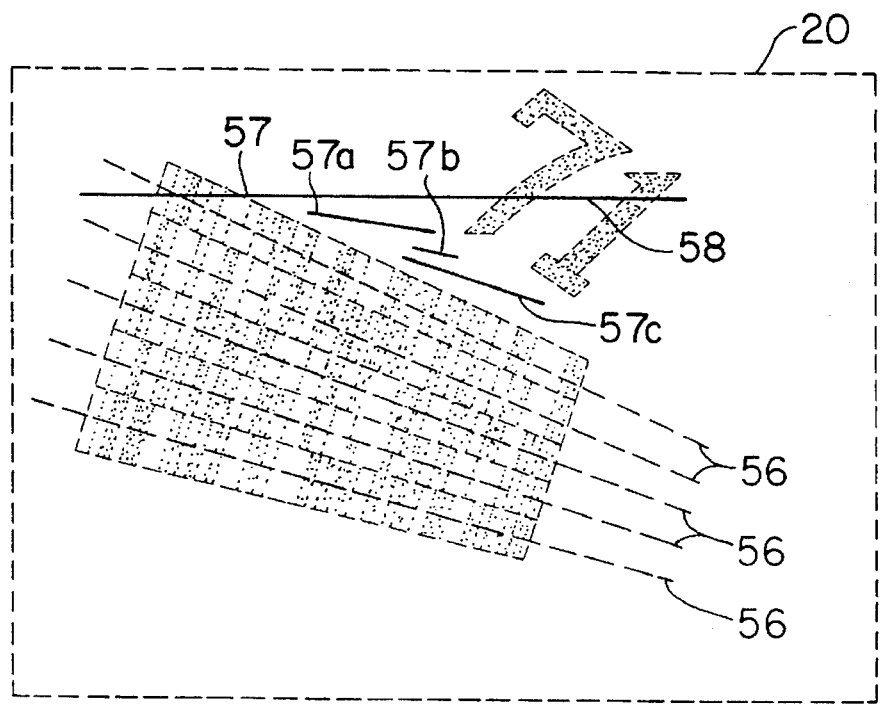
FIG. 6 is a schematic representation of a bit-mapped image of a two-dimensional bar code symbol in a memory array in the system of FIGS. 1 and 3.

Another complicating factor is that the image of the bar code symbol in the memory 20 is not necessarily rectangular; this is in addition to the image likely being at an angle to the major axis. The image is not necessarily rectangular because the package or object on which the symbol resides in the field of view 11 may be twisted rather than being aligned with the plane of the field. This non-alignment will result in a distorted shape as seen in FIG. 6, where the image of symbol bit-mapped into the cell array 55 of the memory 20 is at an angle to the rows of cells and also larger at one end than at the other. Five scan lines 56 must be generated, each at a slightly different angle. Note also that the image might be reversed from left to right if the package having the bar code symbol on it is upside down in the field of view, so the direction of scan can be left-to-right or right-to-left, or otherwise the data can be transposed after loading into the CPU 35.

The data in memory 20 can of course be read in any pattern, as selected by the program executed by the CPU 35. To scan the memory along one of the scan lines 56 of FIG. 6, the row address loaded to the row decoder via bus 37a would be incremented after each read cycle, and the column address loaded to the column decoder would be decremented after a selected number of read cycles, depending upon the angle needed. The number of row address increments for every column address decrement would be higher for the upper lines 56 than for the lower ones in FIG. 6, since the angle needed to trace the row 48 is greater.

Before the scan lines 56 of FIG. 6 at the proper angles could be calculated, the symbol 10' would have to be found in the memory array and the orientation of the rows 48 determined. Various algorithms could be used for this purpose; one would comprise reading the memory array in a raster scan, one row (or column) at a time, in rectilinear fashion, to see if recognizable bar code patterns are found. Such a raster scan of the image of FIG. 6 would find a recognizable code pattern when it reached a position indicated by line 57, corresponding roughly to the 57' of FIG. 4. There are various ways to detecting the existence of a bar code in a serial electrical signal representing a sequence of samples produced by a linear scan; for example, the number of transitions between black and white (1's and 0's) can be counted, and this value, as a function of the length of scan (or transitions per unit length is a distinguishing factor. In this manner, the bar code pattern would be distinct from other printing on the product label such as text or numbers in the area 58 intercepted by the scan line 57 of FIG. 6. Another way of distinguishing a bar code pattern from other images such as area 58 is the ratio of black to white per unit length; bar code symbols fall into a range of such ratios different from printed text or alphanumeric characters found on product labels. Still another way of distinguishing is to compare two adjacent scans to see if the same sequence of 1's and 0's is produced over a substantial part of the row. In addition, of course, the patterns may be compared to valid code patterns stored in ROM in memory 36 by a table lookup. Using any one or combination of such methods, the symbol is found within the memory array by reading data and interpreting strings of this data read-out using instructions executed by the CPU 35 or equivalent logic circuitry. Then, when any part of the symbol has been located, the next task is to find the angular direction of rows. The first attempt is of course a rectilinear line, i.e., a continuation of the line 57 for the remainder of the row, without changing the column address; this will produce no more recognizable bar-code patterns, so a series of angular scans can be implemented, starting at the centerpoint of the addresses which produced the recognized code pattern, for example at 5° increments, producing a series of scan lines 57a, 57b, 57c, etc., until the top line 56 is scanned and a complete line of code is recognized including start and stop codes 49 and 50. If no complete recognizable row is found, but instead a set of partial row segments of increasing then decreasing number of recognizable characters, then the row is curved (resulting from a symbol on a curved surface such as a can or bottle) so the scan line will be switched to a different angle at the address of the end of the scan giving the most recognizable characters, producing a series of segments instead of a straight-line scan. In either event, after one row is recognized, then scans are made parallel to the good row until a different set of good characters is recognized, meaning a new row is being scanned. This continues until a complete symbol has been recognized. Usually, the symbol will contain within its characters information on the number of rows and the number of characters in the symbol, as well as a checksum or CRC of the characters, so a complete symbol can be positively identified by a suitable algorithm executed by the CPU 35. After reading the bit patterns found in the memory array, the CPU 35 can execute table-lookups to convert the bit patterns into characters. Many other algorithms for interpreting the image in the memory 20 and decoding the bar code symbol represented by this image using the instruction set of a commercially-available microprocessor 35 may be selected by a skilled programmer.

The concept of the invention may be implemented in a hand-held reader unit 10 as illustrated in FIG. 1, as well as in a stationary unit. The hand-held device of FIG. 1 is generally of the style disclosed in U.S. Pat. No. 4,760,248, issued to Swartz et al, assigned to Symbol Technologies, Inc., and also similar to the configuration of a bar code reader commercially available as model number LS 8100II from Symbol Technologies, Inc. Alternatively, or in addition, features of U.S. Pat. No. 4,387,297 issued to Swartz et al, or U.S. Pat. No. 4,409,470, issued to Shepard et al, both such patents assigned to Symbol Technologies, Inc., may be employed in constructing the bar code reader 10 of FIG. 1. These U.S. Pat. Nos. 4,760,248, 4,387,297, and 4,409,470 are incorporated herein by reference.

Although the present invention has been described with respect to reading bar codes, it is not limited to such embodiments, but may also be applicable to other types of image processing and analysis. For example, it is conceivable that the scanning method of the present invention may also find application for use with various machine vision or optical character recognition applications in which information is derived from indicia such as characters of from the physical surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system. Alternatively, a wireless connection, using RF or IR communications, may be used.

An individual module may have specific scanning characteristics associated with it, e.g. operability at a certain working distance, or operability with a certain density of symbols. The scanning characteristics may also be defined through the manual setting of control switches associated with the module. The user may also adapt the data acquisition system to scan different types of articles or the system may be adapted for different applications by simply interchanging modules.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar codes readers differing from the types described above.

While the invention has been illustrated and described as embodied in laser scanners for reading two dimensional bar codes, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by Letters Patent is set forth in the appended claims:

1. A system for reading a bar code symbol, said symbol having at least one group of elements, comprising a handheld scanning unit in a lightweight, portable housing comprising:

(a) a light source for generating light beam directed toward a target area including a symbol to be read;

(b) means for optically modifying and directing the light beam along an optical path toward said symbol located in the vicinity of a reference plane exterior to said scanning unit and for scanning spatially adjacent portions of said reference plane;

(c) a photo detector component having a field of view and operative for detecting light of variable intensity reflected off said target area and for generating electrical signals indicative of the detected intensity;

(d) means for converting said electrical signals into digital representations thereof, the digital representations embodying a bit map image of said target area;

(e) means for storing said digital representations in addressable storage medium;

(f) means for accessing said storage medium in an address sequence corresponding to a linear scan through the bit map image and processing each pixel in such linear scan to determine the presence in the bit map image of at least one group of elements of said symbol included within the field of view of said photo detector component; and (g) means for automatically changing said address sequence to a second linear scan if said linear scan results in recognizing only a portion of a group of elements of said symbol.

2. The system of claim 1 wherein said group is a row.

3. The system of claim 1 wherein said light source comprises a laser diode.

4. The system of claim 1 wherein said addressable storage medium is a memory array.

5. An apparatus for detecting indicia including a plurality of groups of elements of different light reflectivity, comprising:

(a) a light source for emitting a light beam;

(b) an optical component disposed in the path of said beam for optically modifying and directing the light beam along an optical path toward a target located in the vicinity of a reference plane lying in said optical path so as to scan spatially adjacent elements of groups in said reference plane in a first scan direction;

(c) sensor means having a field of view operative for detecting light of variable intensity reflected off said target, and for generating an electrical image of said field of view of said sensor means;

(d) means for storing said electrical image in an addressable storage medium;

(e) means for performing a linear scan of said electrical image in said addressable storage medium; and (f) means for changing said linear scan of said electrical image to a different linear scan if a partial but not complete group of elements is recognized by the linear scan of step (e).

6. The apparatus of claim 5 wherein said groups are rows.

7. The apparatus of claim 5 wherein said light source comprises a laser diode.

8. The apparatus of claim 5 wherein said optical component comprises a scanning mirror.

9. The apparatus of claim 8 wherein said scanning mirror is connected to mechanical means for moving said scanning mirror so as to direct said light beam along said optical path.

10. The apparatus of claim 5 wherein said means for processing said electrical signal comprises a microprocessor.

11. A system for reading a bar code symbol, said symbol having at least one row, comprising:

a hand-held scanning unit in a lightweight, portable housing including (i) a light source for generating a light beam directed toward a symbol to be read;

(ii) means for optically modifying and directing the light beam along an optical path toward said symbol located in the vicinity of a reference plane exteriorly of the scanning trait and for scanning spatially adjacent portions of said reference plane;

(iii) a photodetector component having a field of view and operative for detecting at least a portion of light of variable intensity reflected off the symbol and for generating electrical signals indicative of the detected intensity;

(iv) means for converting said electrical signals into digital representations thereof, the digital representations embodying a bit-map image of the field of view of said photodetector component;

(v) means for storing said digital representations in an addressable storage medium; and (vi) means for accessing said storage means in an address sequence corresponding to a linear scan through the bit-map image and determining if a row of the bit-map image corresponds to a row of the symbol; and (vii) means responsive to said determining for automatically changing said accessing to a second address sequence if said linear scan recognizes a partial row of said symbol.

12. A system as defined in claim 11, wherein said means for accessing said storage means addresses rows and columns of an array of memory cells in a sequence of addresses representing a raster scan of the field of view at a predetermined angle with respect to the axes of the field of view.

13. A system as defined in claim 11, wherein said symbol includes a plurality of rows and bar and space patterns in a two-dimensional array, and further comprises means for processing the data derived from said storing means to determine whether a predetermined pattern is present in the field of view.

14. A system as defined in claim 11, wherein said means for optically modifying and directing the laser beam generates a scan pattern of mutually parallel scan lines.

15. A method for reading a symbol, the symbol comprising at least one recognizable code pattern, comprising the steps of:

(a) directing a light beam from a light source in a scanning pattern over a symbol to be read;

(b) detecting at least a portion of light of variable intensity reflected off the symbol over a field of view and generating digital data representative of the detected light intensity;

(c) transferring the digital data to a memory array such that a digital bitmapped image of the field of view is obtained;

(d) outputting a portion of the digital bitmapped image data from the memory array in such a manner that a scan of the bitmapped image of at least a portion of a scan line is obtained;

(e) processing said outputted portion of said digital bitmapped image data to determine if a code pattern of an entire row of a bar code symbol was scanned; and (f) changing said outputting of a portion of the digital bitmapped image data if it is determined that a code pattern of a partial row of a bar code symbol was obtained in the output from the memory array.

16. The method of claim 15, wherein the symbol comprises at least two recognizable code patterns wherein steps (d), (e) and (f) further comprise the steps of:

(d) outputting the digital bitmapped image data from the memory array in a first manner such that a rectilinear scan of the bitmapped image is obtained;

(e) processing the output digital bitmapped image data from step (d) to identify a first recognizable code pattern;

(f1) outputting the digital bitmapped image data from the memory array in a second manner such that an angular scan of the bitmapped image is obtained; and (f2) processing the output digital bitmapped image data from step (f1) to identify a second recognizable code pattern thereby reading the symbol.

17. The method of claim 15, wherein the scanning pattern of step (a) comprises a pattern of mutually parallel lines.

18. A method of reading a symbol containing light variable elements arranged in multiple rows comprising the steps of:

(a) directing a light beam across a target area containing said symbol in a pattern sufficient to capture all elements contained in said target area;

(b) creating an electrical image of reflected light of varying intensity from said target area;

(c) storing said electrical image in an addressable storage medium;

(d) processing said electrical image by performing a linear scan of said addressable storage medium in an effort to read said symbol;

(e) manipulating said linear scan of said addressable storage medium until the entire row of said symbol is recognized; and (f) continuing the linear scan for which an entire row of said symbol was recognized, until the entire symbol is read.

19. The method as defined in claim 18 wherein said step of directing a light beam includes generating a scan pattern of mutually parallel scan lines.

20. The method of claim 18 wherein the steps are performed using a hand-held unit which includes a manually-activated trigger, and the method further includes the step of manually actuating said trigger to initiate said step of directing said light beam.

21. A method for scanning a bar code symbol having a plurality of discrete groups of information containing elements of different light reflectivity on a target, comprising the steps of:

(a) directing a light beam in a scanning pattern over a target area containing a symbol to be read;

(b) detecting reflected light of variable intensity reflected off said target area;

(c) generating electrical signals indicative of said detected light of variable intensity;

(d) converting said electrical signals into digital representations thereof, said digital representations comprising a bit map image of said target area;

(e) storing said digital representations in an addressable storage medium;

(f) accessing said addressable storage medium in a first address sequence corresponding to a first linear scan through said bit map image;

(g) processing each pixel in said linear scan to determine the presence in said bit map image of at least a portion of one group of elements of said symbol;

(h) changing said address sequence to create a different linear scan through said bit map image if less than all of a group of elements of said symbol was determined to be present;

(i) processing each pixel in said different linear scan to determine the presence in said bit map image of at least a portion of one group of elements of said symbol;

(j) repeating steps (g) and (h) until an entire group of elements of said symbol is recognized; and (k) continuing the linear scan for which an entire group of elements of said symbol was recognized.

22. A method as defined in claim 21, wherein said step of directing said light beam includes generating a scan pattern of mutually parallel scan lines.

23. A method as defined in claim 21, wherein said step of accessing the addressable storage medium includes addressing the rows and columns of said addressable storage medium in a sequence of addresses that represents a linear traversal of the field of view.

24. The method of claim 21 wherein the steps are performed using a hand-held unit which includes a manually-activated trigger, and the method further includes the step of manually actuating said trigger to initiate said step of directing said light beam.

25. A method for scanning a bar code symbol having a plurality of rows of data comprising the steps of:

(a) scanning a light beam over a target area containing a symbol to be read;

(b) creating a digital representation of reflected light from said target area;

(c) storing said digital representation in memory;

(d) accessing said memory in a linear scan;

(e) determining for each scan line whether a portion of a row of said symbol has been recognized;

(f) changing said linear scan of said memory to a different scan path if only a portion of a row of said symbol was recognized in step (e);

(g) repeating steps (d)–(f) until an entire row of said symbol is recognized; and continuing said linear scan with which an entire row was recognized.

* * * * *